US012259226B1

(12) United States Patent
Ebdah

(10) Patent No.: US 12,259,226 B1
(45) Date of Patent: Mar. 25, 2025

(54) METHOD OF MEASURING THICKNESS OF THIN FILMS USING DIFFRACTION OF POLARIZED LIGHT THROUGH A THIN FILM

(71) Applicant: KING SAUD UNIVERSITY, Riyadh (SA)

(72) Inventor: Mohammad Ahmad Ebdah, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/650,634

(22) Filed: Apr. 30, 2024

(51) Int. Cl.
*G01B 11/06* (2006.01)

(52) U.S. Cl.
CPC ...... *G01B 11/0616* (2013.01); *G01B 11/0641* (2013.01)

(58) Field of Classification Search
CPC .................. G01N 2223/056; G01N 2223/05
See application file for complete search history.

(56) References Cited

U.S. PATENT DOCUMENTS

| | | | |
|---|---|---|---|
| 3,806,251 A * | 4/1974 | Dandliker | G01B 11/00 250/550 |
| 3,884,581 A * | 5/1975 | Pryor | G01B 11/2433 356/505 |
| 4,999,508 A | 3/1991 | Hyakumura et al. | |

(Continued)

FOREIGN PATENT DOCUMENTS

| | | | | |
|---|---|---|---|---|
| CN | 102607435 A | * | 7/2012 | ............ G01B 15/02 |
| JP | 2000-0437 A | | 1/2000 | |

OTHER PUBLICATIONS

Song Min, An optical method of online measurement for the thickness of thin films, Proceedings vol. 6834, Optical Design and Testing III., Nov. 28, 2007 (Year: 2007).*

(Continued)

*Primary Examiner* — Michael P LaPage
(74) *Attorney, Agent, or Firm* — Nath, Goldberg & Meyer; Joshua B. Goldberg

(57) ABSTRACT

The method for measuring the thickness of thin films uses diffraction of a polarized light beam through a thin film to indirectly measure its thickness. The thin film is prepared on an optically opaque substrate and the thin film and the optically opaque substrate are sandwiched between a pair of optically opaque walls, in a manner similar to a conventional single-slit diffract setup where the thin film serves as the slit. A polarized light beam with a wavelength $\lambda$ is diffracted through the thin film such that a diffraction pattern is formed on a surface. A set of light intensities of the diffraction pattern formed on the surface is measured for multiple values of a diffraction angle $\theta$. A thickness, $d$, of the thin film is then determined by fitting the measured set of light intensities to an equation for normalized intensity, $I_{nor}(\theta, d, \lambda)$, given by $$I_{nor}(\theta, d, \lambda) = \left[\frac{\sin\left(\pi\frac{d}{\lambda}\theta\right)}{\pi\frac{d}{\lambda}\theta}\right]^2.$$

6 Claims, 3 Drawing Sheets

(56) References Cited

U.S. PATENT DOCUMENTS

| | | | | |
|---|---|---|---|---|
| 6,069,934 | A * | 5/2000 | Verman | G01N 23/20016 378/81 |
| 9,079,283 | B2 | 7/2015 | Galletti et al. | |
| 11,781,999 | B2 * | 10/2023 | Krokhmal | G01N 23/207 378/86 |
| 2006/0062350 | A1 * | 3/2006 | Yokhin | G01N 23/20008 378/86 |
| 2006/0192973 | A1 * | 8/2006 | Aiyer | G01B 11/0641 356/487 |
| 2006/0262327 | A1 * | 11/2006 | Foes | G01B 11/0633 356/632 |
| 2011/0007329 | A1 * | 1/2011 | Woo | G03F 7/70625 356/625 |
| 2012/0323356 | A1 * | 12/2012 | Dziura | G01N 21/47 703/2 |
| 2014/0348298 | A1 * | 11/2014 | Ghammraoui | G01T 1/366 378/73 |
| 2015/0142395 | A1 * | 5/2015 | Cao | G03F 7/70625 703/1 |
| 2017/0059303 | A1 * | 3/2017 | May | H01L 22/00 |
| 2017/0363550 | A1 * | 12/2017 | Kobayashi | G01N 23/20008 |
| 2020/0024727 | A1 | 1/2020 | Boruah et al. | |
| 2020/0135427 | A1 * | 4/2020 | Vystavel | H01J 37/304 |

OTHER PUBLICATIONS

Matthew Schwartz, Lecture 19: Diffraction and resolution, https://web.archive.org/web/20210131141910/https://scholar.harvard.edu/files/schwartz/files/lecture19-diffraction.pdf, Jan. 31, 2021 (Year: 2021).*

J.G. Pieters, Light transmission through condensation on glass and polyethylene, Elsevier, Agricultural and Forest Meteorology 85 (1997), pp. 51-62 (Year: 1997).*

Ellmer et al., "In situ energy-dispersive x-ray diffraction system for time-resolved thin-film growth studies," Measurement Science and Technology, vol. 14, No. 3, 336, Feb. 12, 2003.

Song et al., "An optical method of online measurement for the thickness of thin films," Proceedings vol. 6834, Optical Design and Testing III., Nov. 28, 2007.

Tavassoly et al., "Application of Fresnel diffraction from a phase step to the measurement of film thickness," Applied Optics, vol. 48, Issue 29, 2009, pp. 5497-5501.

Chung et al., "Surface Wrinkling: a Versatile Platform for Measuring Thin-Film Properties," Advanced Materials, vol. 23, Issue 3, pp. 349-368, Sep. 2, 2010.

Do et al., "Laser beam diffraction at the edge of a film and application to thin film metrology," Applied Optics, vol. 52, Issue 24, pp. 5979-5984, 2013.

Motazedifard et al., "Measurement of thickness of thin film by fitting to the intensity profile of Fresnel diffraction from a nanophase step," JOSA A, vol. 35, Issue 12, pp. 2010-2019, 2018.

* cited by examiner

METHOD OF MEASURING THICKNESS OF THIN FILMS USING DIFFRACTION OF POLARIZED LIGHT THROUGH A THIN FILM

BACKGROUND

Field

The disclosure of the present patent application relates to measurement and testing, and particularly to the indirect measurement of the thickness of a thin film using diffraction of polarized light through the thin film.

Description of Related Art

Measuring semiconductor thin film thickness is important for nanoscale device fabrication and thin film characterization. Measuring thin film thickness typically requires expensive and specialized instruments, such as cross-sectional Transmission Electron Microscopes (TEMs). Additional common techniques, such as Spectroscopic Ellipsometry (SE) and reflectometry, require prior knowledge or spectral modeling of the optical functions of the thin film. Further, although SE is considered highly accurate for ultra-thin films, the technique loses accuracy when determining thin film thickness for thicknesses exceeding 10 µm, thus making it inapplicable for relatively thick thin films. Thus, a method for measuring the thickness of thin films solving the aforementioned problems is desired.

SUMMARY

The method for measuring the thickness of thin films uses diffraction of a polarized light beam through a thin film to indirectly measure its thickness. The thin film is prepared on an optically opaque substrate and the thin film and the optically opaque substrate are sandwiched between a pair of optically opaque walls, in a manner similar to a conventional single-slit diffraction setup, where the thin film serves as the slit. A polarized light beam with a wavelength λ is diffracted through the thin film such that a diffraction pattern is formed on a surface. A set of light intensities of the diffraction pattern formed on the surface is measured for multiple values of a diffraction angle θ. The thickness, d, of the thin film is then determined by fitting the measured set of light intensities to an equation for normalized intensity, $I_{nor}(\theta, d, \lambda)$, given by $$I_{nor}(\theta, d, \lambda) = \left[\frac{\sin\left(\pi\frac{d}{\lambda}\theta\right)}{\pi\frac{d}{\lambda}\theta}\right]^2$$

for sufficiently large L, where L is the distance between the surface and the thin film. The surface may be a camera surface of a camera, such that the camera directly measures the set of light intensities.

Alternatively, the set of light intensities of the diffraction pattern may be measured for multiple values of a distance y measured from a central maximum intensity peak of the diffraction pattern. The thickness d is then determined by fitting the measured set of light intensities to an alternate equation for normalized intensity, $I_{nor}(y, d, \lambda, L)$, given by $$I_{nor}(y, d, \lambda, L) = \left[\frac{\sin\left(\pi\frac{dy}{\lambda L}\right)}{\pi\frac{dy}{\lambda L}}\right]^2,$$

where L is the distance between the surface and the thin film. As a further alternative, the thickness d may also be determined from measured angles of the dark fringes of the diffraction pattern.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Figure 1:
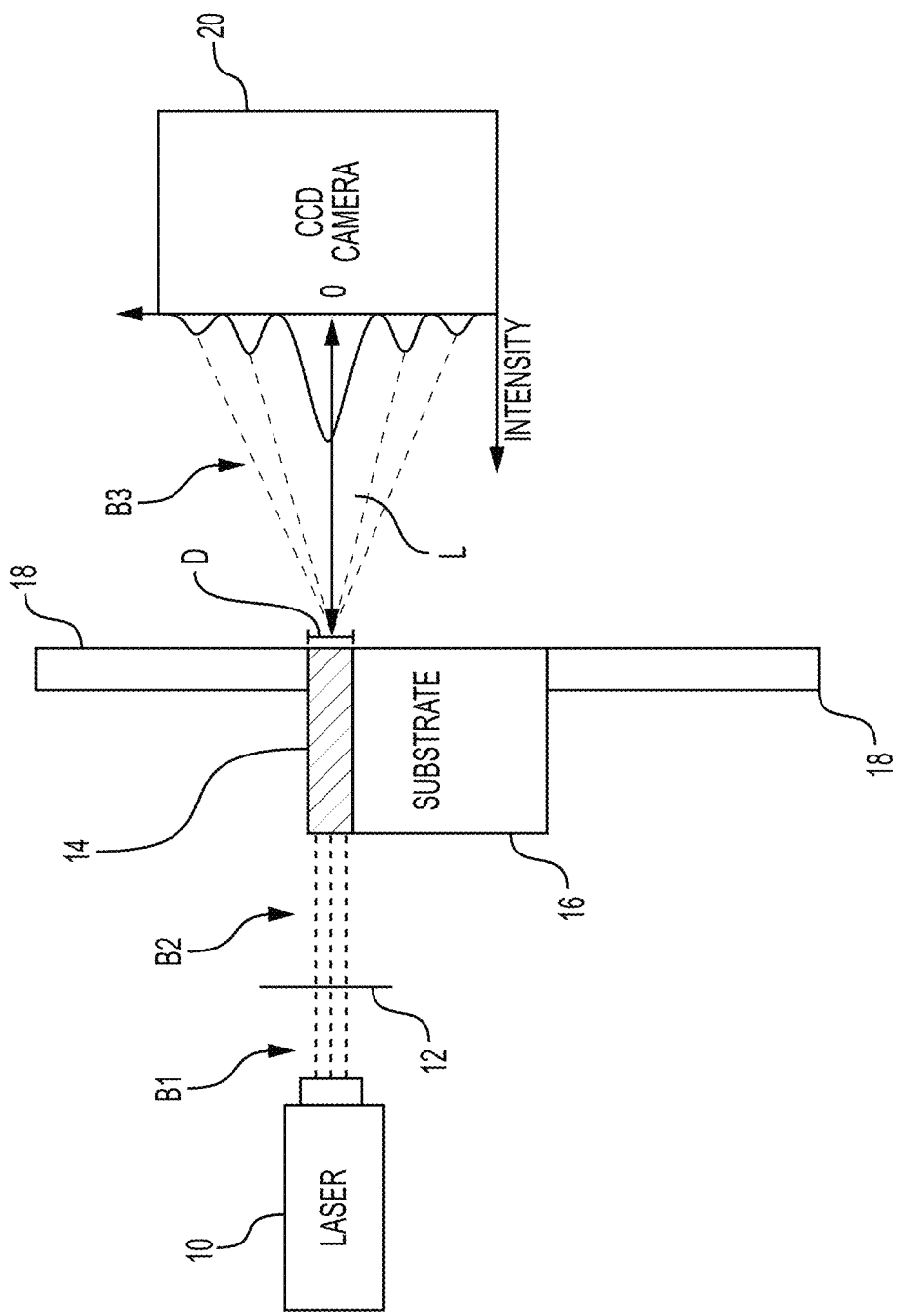
FIG. 1 diagrammatically illustrates an experimental setup for practicing the method for measuring the thickness of thin films.

The method for measuring the thickness of thin films uses diffraction of a polarized light beam through a thin film to indirectly measure its thickness. As shown in FIG. 1, a laser 10 or other suitable type of light source generates an initial light beam B1 which passes through polarizer 12 to form a polarized light beam B2. The polarized light beam B2 enters thin film 14 through its rear edge and is diffracted therethrough in a manner similar to diffraction through a single slit. As shown, the thin film 14 may be formed on an optically opaque substrate 16, and the thin film 14 and the substrate 16 may be sandwiched between a pair of optically opaque walls 18. The optically opaque walls 18 and the substrate 16 are similar to the barrier used in single slit diffraction, with the thin film 14 serving as the slit. It should be understood that thin film 14 may be any type of thin film which is transparent to the polarized light beam B2, such as a nanoscale semiconductor film, a transparent thin film or the like. In order to best correspond to typical single-slit diffraction, thin film 14 and the optically opaque substrate 16 are preferably cleaved in a square or rectangular shape with parallel sides, as shown in FIG. 1.

The diffracted beam B3 forms a diffraction pattern on a surface. In the non-limiting example of FIG. 1, the diffraction pattern is formed directly on the surface of a charge-coupled device (CCD) camera 20 for direct measurement of the varying intensity of the diffraction pattern. However, it should be understood that the diffraction pattern of beam B3 may be formed on any suitable surface for measurement of the varying intensity thereof using any suitable type of camera or other sensor for making light intensity measurements.

Figure 2:
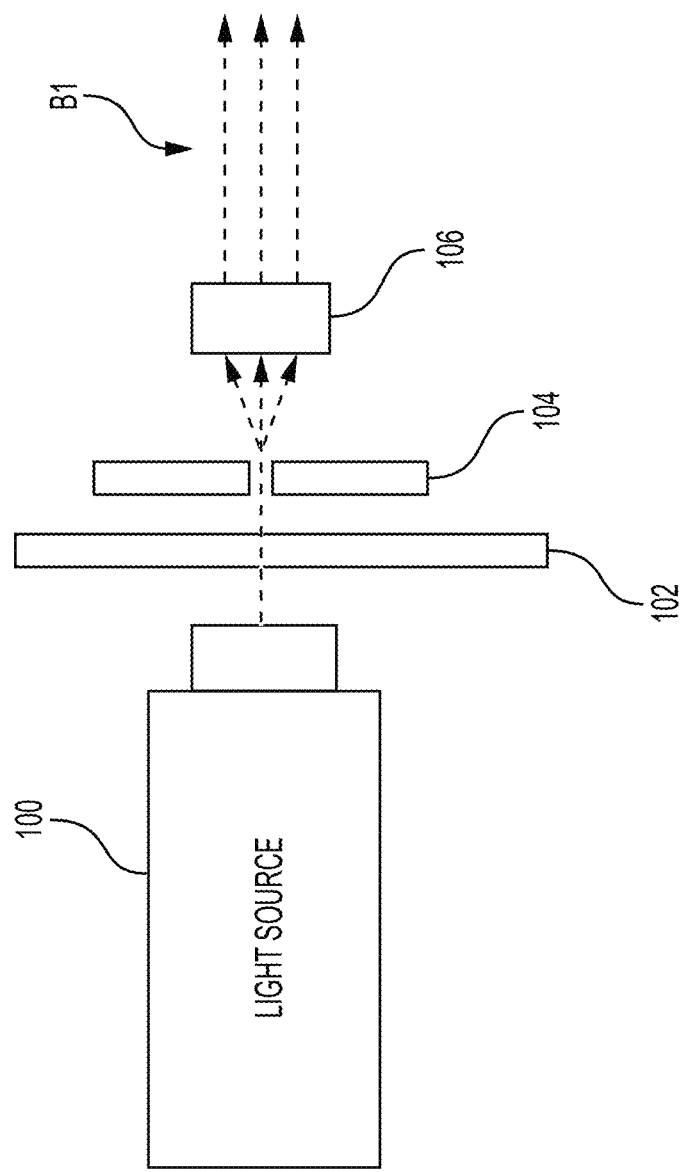
FIG. 2 diagrammatically illustrates an alternative light source for generating a polarized light beam used in the method for measuring the thickness of thin films.

It should be understood that laser 10 is shown for exemplary purposes only and that any suitable type of spectral light source may be used. For example, as shown in FIG. 2, a non-laser spectral light source 100 may be used to produce initial beam B1 by generating non-coherent light which is first passed through a monochromatic optical filter 102 to produce light at a single wavelength. This monochromatic light then passes through an aperture in a screen 104 to diffract the light for receipt by a collimating lens 106, which produces collimated beam B1. As a non-limiting example, spectral light source 100 may be a deuterium halogen (DH) light source, which has a stable emission in the wavelength range of 200 to 2500 nm.

The initial beam B1 generated by laser 10 or spectral light source 100 has an energy less than the thin film energy bandgap. As shown in FIG. 1, the laser beam or collimated beam B1 is perpendicularly incident on the linear polarizer 12. The polarizer axis lies in the same plane as that of the thin film 14. Since the photon energy is less than the thin film bandgap, the polarized beam B2 will propagate transparently through the thin film 14 without absorption from one side to the other. Once the beam emerges from the forward edge of thin film 14 (to the right in the orientation of FIG. 1), it will diffract. The forward edge of thin film 14 acts as a single slit with a slit length equal to the thin film thickness d. The diffracted beams interfere constructively and destructively, and the interference pattern is detected on the surface of CCD camera 20 at a distance L from the forward edge of thin film 14. As in single-slit diffraction, the resultant diffraction pattern consists of bright and dark fringes, where the bright fringes are due to constructive interference and the dark fringes are due to destructive interference. The bright diffraction fringes on the surface of CCD camera 20 consist of a central bright fringe at y=0, with secondary, equally spaced bright and dark fringes on both side of the central fringe.

The diffraction pattern resulting from diffraction through thin film 14 is similar to that of typical single-slit diffraction, thus the normalized intensity, $I_{nor}$, of the diffraction pattern on the CCD camera 20 is given by:

$$I_{nor}(\theta, d, \lambda) = \frac{I(\theta, d, \lambda)}{I_0} = \left[\frac{\sin\left(\pi\frac{d}{\lambda}\sin\theta\right)}{\pi\frac{d}{\lambda}\sin\theta}\right]^2, \quad (1)$$

where $I_0$ represents the maximum intensity of the central bright fringe at $\theta=0$, where $\theta$ is the diffraction angle, d is the thickness of the thin film (equivalent to the width of the slit in single-slit diffraction), and $\lambda$ is the wavelength of the light. The diffraction angle $\theta$ can be written in terms of the height y on the surface of CCD camera 20 and the distance between the forward edge of thin film 14 and the surface of CCD camera 20. This distance is represented by L and the relationship with the diffraction angle $\theta$ is given by:

$$\sin\theta = \frac{y}{\sqrt{y^2 + L^2}}. \quad (2)$$

Using equation (2), equation (1) can be rewritten as:

$$I_{nor}(y, d, \lambda, L) = \left[\frac{\sin\left(\pi\frac{d}{\lambda}\frac{y}{\sqrt{y^2+L^2}}\right)}{\pi\frac{d}{\lambda}\frac{y}{\sqrt{y^2+L^2}}}\right]^2. \quad (3)$$

The diffraction pattern on the surface of CCD camera 20 can be fit to either equation (1) or equation (3), where the film thickness d is the fitting parameter. However, for a relatively large distance L between the thin film 14 and the CCD camera 20, the sine of the diffraction angle can be approximate as $\sin\theta \cong \theta$, and the ratio $$\left(\frac{y}{L}\right)^2$$

becomes negligible. Thus, for large L, equations (1) and (3) reduce to, respectively, $$I_{nor}(\theta, d, \lambda) = \left[\frac{\sin\left(\pi\frac{d}{\lambda}\theta\right)}{\pi\frac{d}{\lambda}\theta}\right]^2, \text{ and} \quad (4)$$

$$I_{nor}(y, d, \lambda, L) = \left[\frac{\sin\left(\pi\frac{dy}{\lambda L}\right)}{\pi\frac{dy}{\lambda L}}\right]^2. \quad (5)$$

The measured intensity of the diffraction pattern on the surface of CCD camera 20 can be fitted to either equation (4) or equation (5), depending on the detection variable of the CCD camera 20 (i.e., either $\theta$ or y), and the film thickness d is set as a free fitting parameter. It should be understood that the data plotting and/or best fit calculations may be performed on a computer or the like using any suitable type of software, as is well-known in the art.

Alternatively, or in addition to the above, the film thickness d can also be extracted from the positions of the dark fringes in the diffraction pattern on the surface of CCD camera 20. The diffraction angles $\theta_{dark}$ of the dark fringes are given by the following expression:

$$\sin\theta_{dark} = m\frac{\lambda}{d}, \quad (6)$$

where $m=\pm1, \pm2, \pm3, \ldots$, thus the thin film thickness d is given by:

$$d = m\frac{\lambda}{\sin\theta_{dark}},$$

where $m=\pm1, \pm2, \pm3, \ldots$ (7)

The value of the thin film thickness d is then given by the average of the calculated thicknesses of all of the dark fringes:

$$\bar{d}_{exp} = \frac{\sum_{i=1}^{n} d_i}{n}, \quad (8)$$

where n is the number of dark fringes observed on the surface of CCD camera 20.

Figure 3:
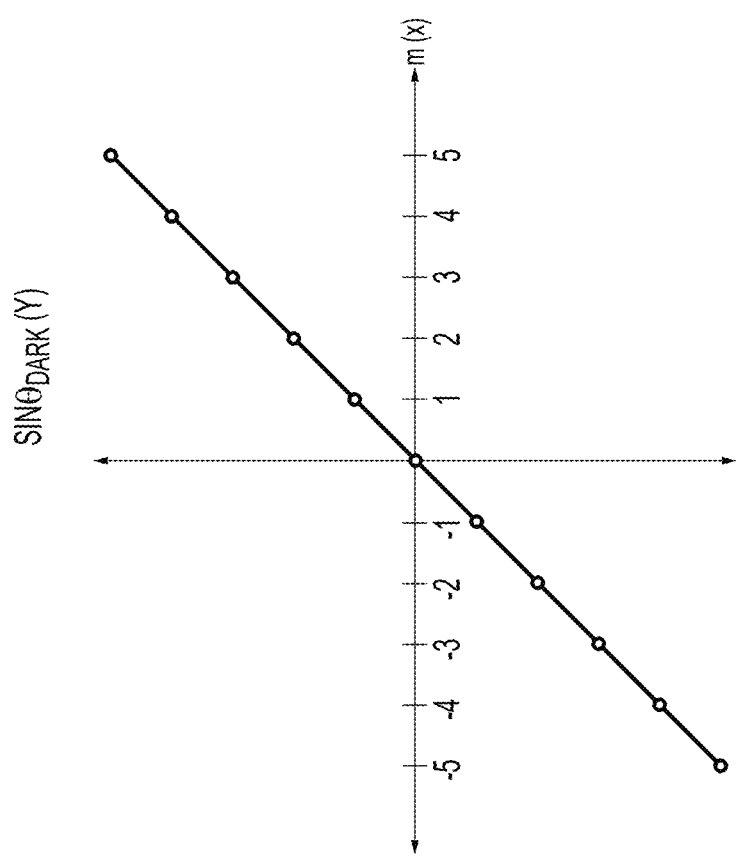
FIG. 3 illustrates an exemplary plot used in an alternative embodiment of the method for measuring the thickness of thin films.

Alternatively, setting $Y=\sin\theta_{dark}$ and $x=m$ in equation (6), the thin film thickness d can be obtained by fitting the plot of the observed dark fringes $Y=\sin\theta_{dark}$ versus $x=m$ to a linear equation $Y=ax$, where the slope $a=\lambda/d$ gives the experimental value for the thin film thickness as $d=\lambda/a$. An example of such a representation is shown in the x-Y plot of FIG. 3.

It is to be understood that the method for measuring the thickness of thin films is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A method of measuring a thickness of a thin film, comprising the steps of:
    forming a thin film on an optically opaque substrate;
    sandwiching the thin film and the optically opaque substrate between a pair of optically opaque walls such that the thin film and the optically opaque substrate are respectively in direct contact with the pair of optically opaque walls;
    diffracting a polarized light beam with a wavelength/ through the thin film such that a diffraction pattern is formed on a surface;
    measuring a set of light intensities of the diffraction pattern formed on the surface for multiple values of a diffraction angle θ; and
    determining a thickness, d, of the thin film by fitting the measured set of light intensities to an equation for normalized intensity, $I_{nor}(\theta, d, \lambda)$, given by $$I_{nor}(\theta, d, \lambda) = \left[\frac{\sin\left(\pi\frac{d}{\lambda}\theta\right)}{\pi\frac{d}{\lambda}\theta}\right]^2.$$

2. The method of measuring a thickness of a thin film as recited in claim 1, further comprising the step of transmitting an initial light beam through a linear polarizer to produce the polarized light beam.

3. The method of measuring a thickness of a thin film as recited in claim 1, wherein the surface comprises a camera surface of a camera, and wherein the camera measures the set of light intensities.

4. A method of measuring a thickness of a thin film, comprising the steps of:
    forming a thin film on an optically opaque substrate;
    sandwiching the thin film and the optically opaque substrate between a pair of optically opaque walls such that the thin film and the optically opaque substrate are respectively in direct contact with the pair of optically opaque walls;
    diffracting a polarized light beam with a wavelength/ through the thin film such that a diffraction pattern is formed on a surface;
    measuring a set of light intensities of the diffraction pattern formed on the surface for multiple values of a distance y measured from a central maximum intensity peak of the diffraction pattern; and
    determining a thickness, d, of the thin film by fitting the measured set of light intensities to an equation for normalized intensity, $I_{nor}(y, d, \lambda, L)$, given by $$I_{nor}(y, d, \lambda, L) = \left[\frac{\sin\left(\pi\frac{dy}{\lambda L}\right)}{\pi\frac{dy}{\lambda L}}\right]^2,$$

where L is a distance between the surface and the thin film.

5. The method of measuring a thickness of a thin film as recited in claim 4, further comprising the step of transmitting an initial light beam through a linear polarizer to produce the polarized light beam.

6. The method of measuring a thickness of a thin film as recited in claim 4, wherein the surface comprises a camera surface of a camera, and wherein the camera measures the set of light intensities.

* * * * *